Figure 1:
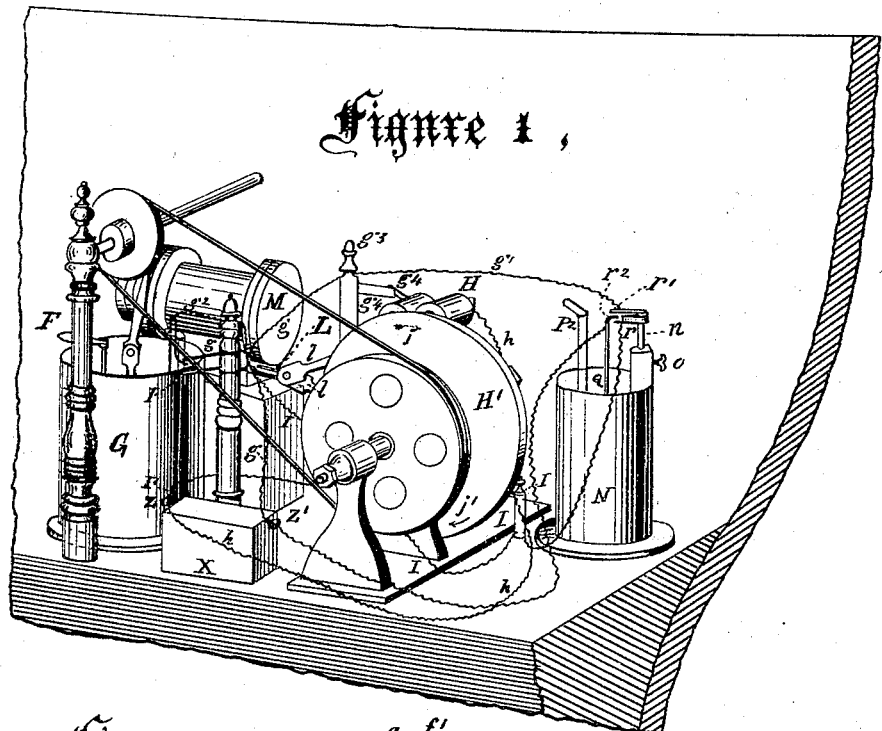

2 Sheets—Sheet 1.

J. SANGSTER & W. S. GROSVENOR.
ELECTRO MAGNETIC GOVERNOR FOR MARINE ENGINES.

No. 182,859. Patented Oct. 3, 1876.

Witnesses.
A. N. Samuels.
H. P. Stiker.

Inventors.
James Sangster
Wm. S. Grosvenor

2 Sheets—Sheet 2.

J. SANGSTER & W. S. GROSVENOR.
ELECTRO MAGNETIC GOVERNOR FOR MARINE ENGINES.

No. 182,859. Patented Oct. 3, 1876.

Witnesses,
A. N. Samuels
F. P. Stiker

Inventors,
James Sangster
Wm. S. Grosvenor

UNITED STATES PATENT OFFICE.

JAMES SANGSTER AND WILLIAM S. GROSVENOR, OF BUFFALO, NEW YORK.

IMPROVEMENT IN ELECTRO-MAGNETIC GOVERNORS FOR MARINE ENGINES.

Specification forming part of Letters Patent No. 182,859, dated October 3, 1876; application filed March 23, 1876.

*To all whom it may concern:*

Be it known that we, JAMES SANGSTER and WILLIAM S. GROSVENOR, both of the city of Buffalo, in the county of Erie and State of New York, have invented certain new and useful Improvements in Marine-Engine Governors, which improvements are fully set forth in the following specification, reference being had to the accompanying drawings.

Our invention relates to certain improvements in governors for regulating the speed of marine engines; and it consists, first, in a governing device operated by the difference in the speed of the engine produced by the breaking of a wheel, key, or other cause, in combination with a governing device operated by the difference in the speed of the engine produced by the varied immersion of the propeller. Each governor controls an electro-magnet coupled with the stem of the slide-valve of an auxiliary engine, that governs the throttle-valve, and the two electro-magnets have a revolving armature in common, which, when the electro-circuit is closed through either or both electro-magnets, moves the latter, and by thus shifting the slide-valve causes an action of the auxiliary engine on the throttle-valve. Second, our invention further consists in a rotating armature receiving its motion from the machine to be governed, in combination with two electro-magnets, a suitable battery or an electro-magnetic machine, and the necessary connections for forming or breaking an electric current therewith, for the purpose of operating the valve of a marine engine. Third, our invention further consists of one or more capsules or other vessels containing air, alcohol, or other liquid material capable of being expanded or contracted by a difference in temperature, in combination with a pipe for conducting steam thereto and the necessary connections for operating the steam-supply valves of a marine engine, the whole being arranged so that steam is admitted to the capsule or bulb when the propeller has emerged out or partly out of the water, according to adjustment, thereby causing an expansion of the air or liquid within it, and closing the steam-supply valve by moving the connections leading thereto, and so that the action of the valve will be reversed by the contraction of the said material within the capsule when the propeller descends far enough to cause it to be sufficiently immersed in the water, as will be more clearly hereinafter shown by reference to said drawings, in which we have shown a suitable apparatus for carrying out our said invention—

Figure 2:
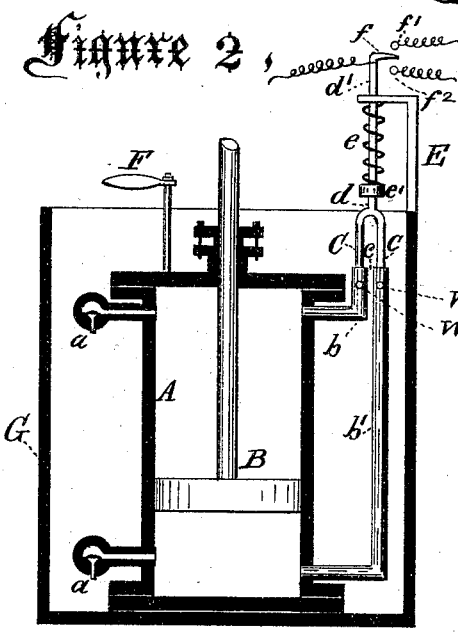
Figure 3:
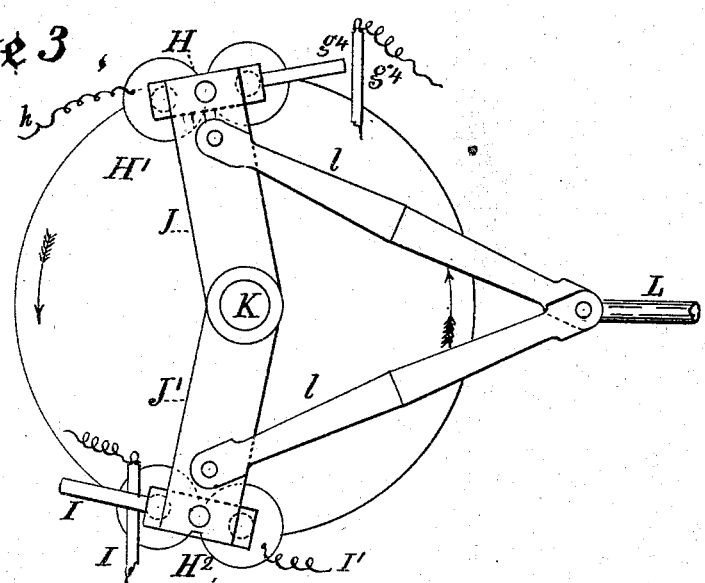
Figure 4:
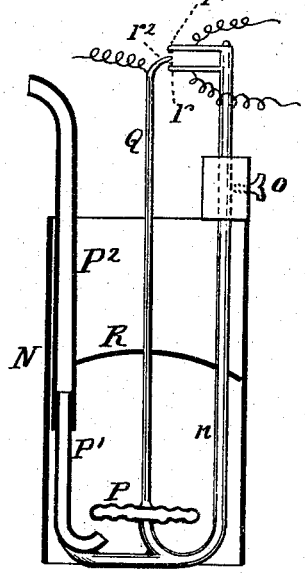
Figure 5:
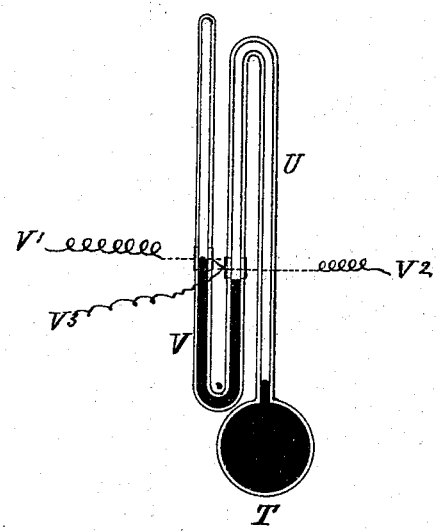

Figure 1 being a perspective view; Fig. 2, a vertical section through the governor operated by the increased or diminished speed of the engine, showing a device for forming or breaking an electric circuit. Fig. 3 is a view of the rotating armature or disk with its magnets and connections. Fig. 4 represents a vertical section through the apparatus forming a portion of the governor to be operated by the varied immersion of the propeller, and Fig. 5 shows a modification of a portion of the same.

The mechanism operated by the varying speed of the engine consists of a cylinder, A, provided with valves $a\ a$, a piston, B, operated by a connection with the engines, two tubes, $b\ b'$, arranged so as to be brought together, or nearly so, at $c$, into each of which is fitted a piston, C C, which are fastened together at $d$, and terminate in the rod $d'$. B is a frame for supporting said rod vertically, so that it may move easily up or down. $e$ is a spring for holding it down, and $e'$ a nut for regulating the pressure of the same. $f$ represents a projection from the rod $d'$, adapted for forming and breaking a circuit of electricity. F is a handle for opening or closing two stop-cocks—one near the top and one at the bottom of cylinder A.

G represents a vessel for holding water or other liquid, into which the said cylinder A is placed, as shown in Fig. 2. H $H^2$ are two electro-magnets fastened to levers J $J^1$, which are arranged to swing on a center at K. Two arms, $l\ l$, connect said levers with the valve-stem L, as shown in Fig. 3.

In the drawing we have shown an auxiliary cylinder, M, having the controlling steam-valve connected thereto, but any other kind of valve may be used.

N in Figs. 1 and 4 represents a tube placed at some convenient point near the stern of the vessel, and having an outlet at the side or bottom of the same. $n$ is a rod, made adjustable vertically by a set-screw, O. To the lower part of this rod is attached a capsule, P, or its equivalent, having a liquid or gas within it to be expanded by heat, and also a tube, P¹, arranged to slide easily in the tube P² when the rod n is being adjusted. The object of the tube P¹ P² is to conduct steam from the boiler to heat the capsule P when out of the water. A rod, Q, for forming and breaking an electrical circuit is fastened to the capsule, as shown. $r\ r^1$ are two points connecting with the electro-magnets and a battery or magneto-electric machine, and $r^2$ the point on rod Q for breaking or transferring the current from one to the other. R represents a cover fitted closely within the tube N, so as to move easily up or down within it. It is fastened rigidly to rod n, Q passing through it and tube P² being stationary. R is made to slip along it while n is being adjusted vertically.

The operation of that part of our invention depending upon the variations in the speed of the engine for its action is as follows: The piston B is reciprocated by the engine to be governed. The stop-cocks controlled by the handle F are both opened as far as a specified speed of the engine requires, the object of the stop-cocks being to afford the means for regulating the pressure of liquid within the cylinder by diminishing or increasing an opening at each end of the same, said openings being greater for a fast speed than for a slow speed.

It will be seen that an upward movement of the piston B will lift the lower valve $a$ and draw in a portion of the liquid through it from the vessel G, and also through the stop-cock at the lower part of A, while the liquid in cylinder A above the piston-head B, by its pressure, closes the upper valve $a$, forces a portion of the liquid through the upper stop-cock, and exerts a pressure up against the piston C in tube $b$, more or less great according to the speed of the engine and the distance the stop-cocks may be opened. A downward movement of the piston B will reverse the action of the valves $a\ a$ and produce an upward pressure against the piston C, in tube $b'$, the parts being adjusted so that when the engine moves beyond a certain speed the pressure will be sufficiently increased to lift the piston C C, and, by their connections, close the valve for admitting steam to the engine and hold it closed until the speed decreases enough to allow said pistons to drop and open it again. The circuit is closed by the points $f f^1$, from which it passes along the wire $g$ to post $g^3$, and from thence, through the connections $g^4\ g^4$, to the upper electro-magnet H, from which it passes through wire $h$ to the pole Z of the battery X, and charges the said magnet, thereby attracting the armature or disk H¹, which continuously rotates close to it and causes said magnet to move the valve through its connections, in the direction of the arrow $j$, Fig. 1, until the connections $g^4\ g^4$ are separated, and the circuit I and its connections with the lower electro-magnet H², similar to $g^4\ g^4$, are formed, so that when the pistons C C descend and form the other connections $f f^2$, the valve will be reversed or moved in the direction of the arrow $j^1$ by means of the electro-magnet H².

The mechanism for controlling the speed of the engine by the variations in the immersion of the propeller is operated as follows: The tube P² is arranged so that it will convey steam from the boiler. The capsule P is adjusted to suit the immersion of the vessel in the water, produced either by a difference in the load or otherwise, the adjustment being such that when the vessel is on an even keel, or in still water, the capsule is at a specified distance below the level of the same. Steam is admitted, when required, during a storm or rough weather, to the capsule P through the tube P², either from the boiler or from the exhaust, through the tube P² P¹, so that when the propeller is out of the water it will strike against the capsule, and by its heat expand the material within it, and lift the rod Q, so that points $r^2\ r^1$ will be connected and the circuit formed with the electro-magnet H through $g^1$, and from thence in a similar course to that described for operating the speed device, and thereby close the valve in a similar manner.

When the propeller descends into the water deep enough to cause the capsule to be immersed therein, it is cooled sufficiently to contract enough to form the other circuit with H² and reverse the action of the valve, thereby admitting steam to the engine. It may also be connected so as to control the vacuum when required.

In Fig. 2, W W represent a relief in the tubes $b\ b^1$, so that when the pistons C C have moved upward far enough to open them, the pressure against them ceases to a certain extent, as the liquid has free access through them when thus opened.

The modification shown in Fig. 5 is made of glass or other non-conducting material, the bulb is filled with alcohol or its equivalent, the light portion U above it is air and the black portion V in the lower bend of the tube represents mercury for transferring the electrical current from points V¹ to V², V³ being the wire leading to the battery.

It will be readily seen that when T is expanded by heat there will be a pressure down on one side of the double mercury column V, forcing it into the position shown, the opposite side of the column being the highest, thereby forming the connection V¹, and that when T is contracted by a lower temperature the double column V finds its level, thereby breaking connection V¹ and completing circuit V².

We claim as our invention—

1. The combination, substantially as specified, with the steam-supply governing-valve, of the revolving armature, an electro-magnet controlled by a governor, which responds to variations in the speed of the engine, and an electro-magnet controlled by a governor, which responds solely to variations in the immersion of the propeller.

2. The combination, substantially as specified, of the continuously-rotating armature, the electro-magnet normally at rest, but adapted to move with the armature when charged, and the circuit-breaker limiting the conjoined motion of the magnet and armature.

3. The combination, substantially as specified, of the continuously-rotating armature, two electro-magnets placed on opposite sides of the axis of the armature and linked together, as described, and, while normally at rest, adapted to move with the armature alternately when charged, and two circuit-breakers respectively arranged on opposite sides of the magnets.

4. One or more capsules, P, or their equivalents, arranged at or near the stern of a vessel, having an opening for admitting water thereto, in combination with the steam-tube $P^1$, rod Q, and the necessary connections for operating the steam-supply valve of a marine engine, substantially as and for the purposes described.

JAMES SANGSTER.
WM. S. GROSVENOR.

Witnesses:
A. N. SAMUELS,
F. P. STIKER.